United States Patent [19]

Polak et al.

[11] Patent Number: 4,573,768
[45] Date of Patent: Mar. 4, 1986

[54] ELECTROCHROMIC DEVICES

[75] Inventors: Anthony J. Polak, Lake Zurich; James A. Wrezel, Buffalo Grove; Allyson J. Beuhler, Indian Head Park, all of Ill.

[73] Assignee: The Signal Companies, Inc., La Jolla, Calif.

[21] Appl. No.: 558,231

[22] Filed: Dec. 5, 1983

[51] Int. Cl.[4] .................................................. G02F 1/01
[52] U.S. Cl. ...................................................... 350/357
[58] Field of Search ........................................... 350/357

[56] References Cited

U.S. PATENT DOCUMENTS

| 3,843,232 | 10/1974 | Berets | 350/160 R |
| 3,975,086 | 8/1976 | Leibowitz | 350/160 R |
| 3,995,943 | 12/1976 | Jasinski | 350/160 R |
| 4,184,751 | 1/1980 | Nicholson | 350/357 |
| 4,193,670 | 3/1980 | Giglia et al. | 350/357 |
| 4,253,741 | 3/1981 | Nakauchi et al. | 350/357 |
| 4,306,773 | 12/1981 | Arnoldussen | 350/357 |
| 4,306,774 | 12/1981 | Nicholson | 350/357 |
| 4,350,414 | 9/1982 | Sagamihara | 350/357 |

Primary Examiner—Norman Morgenstern
Assistant Examiner—Kenneth Jaconetty
Attorney, Agent, or Firm—Thomas K. McBride; William H. Page, II; Raymond H. Nelson

[57] ABSTRACT

Electrochromic display devices which will maintain coloration after the electric current has been removed will comprise an electronic conductor consisting of a support which may be electrically conductive per se or contain an electronic conductor thereon, an electrochromic material in contact with said conductor, a solid electrolyte comprising a blend of an organic polymer and a heteropoly acid or salt thereof disposed on said electrochromic material and a counter-electrode in contact with the solid electrolyte. By utilizing this type of solid electrolyte, it is possible to obtain a display device which may range from about 5 to about 100 microns in thickness.

37 Claims, 2 Drawing Figures

ELECTROCHROMIC DEVICES

BACKGROUND OF THE INVENTION

Electrochromism is the change in light-absorbing properties of a material under the influence of an applied voltage. The induced coloration will remain even after the voltage is removed. An electrochromic material has the property of changing color when the voltage is applied across the material or, alternatively, if a current is passed through it. The electrochromic material can be made to return to its original light absorbing state or color by reversing the polarity of the voltage or current. By changing the polarity of the applied voltage or current, known electrochromic materials which may be both organic and inorganic in nature can be cycled in such a manner so that the color change may be made from clear or transparent to colored, or from one color state to another color state, the last case being characteristic but not exclusive of organic materials. For example, electrochromic displays may go from clear to blue, from yellow to blue, from red to blue, from green to blue/black, etc., and the reverse. This is in contradistinction to other displays such as light-emitting diode displays which may go from off to red or liquid crystal displays which may go from clear to blue and reverse. Once an electrochromic display is in either its color or transparent state, it will remain in such a state for a considerable lengthy period of time, even though the power has been turned off. This is also in contradistinction to light-emitting diode displays and liquid crystal displays which require continuous power in order to be seen. The characteristics which are possessed by electrochromic displays include a low voltage operation, low power requirements, storage of the display without the dissipation of power, potentially low cost as well as a relatively simple construction and will provide a pleasing display in that the color will be present in a relatively good contrast compared to the background while providing a wide angle of viewing.

The electrochromic material which is utilized in electrochromic displays must possess a color center or other color absorbing structure having some optical absorption in the visible light range plus the presence of both electronic and ionic conduction. One class of electrochromic materials of the type hereinafter set forth in greater detail will possess high ion mobilities and the ability to produce a strong optical absorption in the visible light range upon injection of electrons. The protons which are present in the electrolyte which is in contact with the electrochromic material will contact said electrochromic material and provide a means of maintaining charge neutrality in the electrochromic material. An example of this color change occurs when an electrochromic material such as tungsten trioxide is subjected to the action of an applied voltage through an electrolyte to form what is called tungsten bronze, said tungsten bronze producing a blue color from the colorless tungsten trioxide. To reverse the coloration process and bleach out the blue color produced by the tungsten bronze, the polarity is reversed so that the electrons and protons leave the electrochromic material, said polarity reversal being effected until the entire tungsten bronze has been reconverted to the tungsten trioxide and the latter is restored to its original colorless state.

In the past, there have been electrochromic devices utilizing this phenomena. For example, U.S. Pat. No. 4,306,773 discloses an electrochromic display device utilizing a tungsten trioxide film and an aqueous acidic electrolyte in contact with the surface of said film. Likewise, U.S. Pat. No. 3,843,232 also discloses an electrochromic device utilizing an electrochromic material and an ion-conductive medium between the electrochromic material such as tungsten trioxide and a counterelectrode such as palladium, said ion-conductive medium being liquid in nature such as a strong sulfuric acid solution. It is to be noted that both of these patents disclose the use of a liquid electrolyte such as sulfuric acid. The use of liquid electrolytes possess certain disadvantages. For example, the display cell utilizing a liquid electrolyte requires a relatively complicated construction inasmuch as care must be taken to insure a permanent seal of the electrolyte within the cell inasmuch as any leakage of the electrolyte will result in a breakdown of the display device. The care and means which are undertaken to insure the permanent seal of the electrolyte will, of necessity, add to the expense in manufacturing such a device. Likewise, the acid may have a tendency to attack the electrochromic material, thus leading to a failure of the device after a period of time.

In addition to the aforementioned U.S. patents, other U.S. patents disclose solid electrochromic display devices. In this respect, U.S. Pat. No. 3,995,943 shows a display device utilizing as an electrochromic material an oxide of tungsten or vanadium and a solid electrolyte comprising a mixed inorganic silver salt, one salt being silver iodide. U.S. Pat. No. 4,306,774 utilizes, as the electrochromic material a layer of material being selected from the group consisting of a diphthalocyanine of a rare earth element, yttrium and scandium. The solid electrolyte which is employed is selected from the group consisting of a heteropoly acid and hydrogen uranyl phosphate. Another solid state electrochromic device is shown in U.S. Pat. No. 4,350,414 which comprises a pair of electrodes, an oxidizable film and a reducible film capable of a redox reaction as well as an insulating film positioned between the oxidizable film and the insulating film. U.S. Pat. No. 4,184,751 discloses an electrochromic chromic display utilizing a metal diphthalocyanine complex and as the electrolyte a porous solid which has been saturated with an inert electrolyte such as an aqueous solution of potassium chloride. The porous solid which is illustrated in this patent comprises calcium sulfate dihydride, commonly known as plaster of paris which is white in nature and is preferred in order that the plaster will not adversely affect the colors which are generated during the display. However, such a system will still involve the use of a wet electrolyte with the attendant costs and disadvantages previously discussed with reference to the use of liquid electrolytes.

In contrast to these discussed electrochromic devices, we have now discovered that an electrochromic device may be prepared in a solid state utilizing, as a solid electrolyte, a blend of an organic polymer and a heteropoly acid or salt thereof. This solid electrolyte will provide the advantage of being an excellent proton-conducting material whereby the disassociated molecular hydrogen will migrate through the polymer as a proton and provide the impetus necessary to effect the desired color change. In addition, the polymer blend electrolyte will also possess other advantages over the electrolytes of prior use, said advantages being subsequently more fully discussed.

BRIEF SUMMARY OF THE INVENTION

This invention relates to electrochromic devices. More specifically, the invention relates to an electrochromic display device which utilizes, as a solid electrolyte, a polymeric blend of an organic compound and a heteropoly acid or salt thereof, said solid electrolyte being a proton-conducting substrate whereby disassociated hydrogen will migrate through the electrolyte and activate the electrochromic material, thus providing the necessary change in color essential for the operation of the device.

Electrochromic devices in which a chemical change is produced in response to an electrical potential applied to the material will provide changes in color in electrochromic materials which are a part of the device. This change in color of the material will enable the device to be used in any circumstances involving a color display. For example, the electrochromic display devices may be used for watches, calculators, computers, radio, television, etc. The electrochromic devices possess many advantages over other electrically controllable display devices such as liquid crystal displays, light-emitting diode displays, plasma displays, etc. The power requirements for the electrochromic display devices (ECD) will be approximately the same as the liquid crystal displays (LCD) and less than that required to activate light-emitting diode displays (LED). Other advantages have also been previously discussed and, in addition, the ECD can be viewed in a bright light with no restriction on the viewing angle as distinguished by the disadvantage possessed by the LED which cannot be viewed in a bright light and possesses a restricted viewing angle. Likewise, LCD devices are only operative over a limited temperature range and, like the LED, possess no memory, but must be refreshed. This is in contrast to the ECD which has a nonvolatile memory and will retain the color despite the absence of any power. Likewise, ECD's may also be made in a relatively large assortment of colors in contrast to the LCD or LED devices which possess only one color.

By utilizing a blend of an organic polymer and a heteropoly acid or salt thereof of the type hereinafter set forth in greater detail as the solid electrolyte, it is possible to obtain several advantages over an electrochromic display device which utilizes other types of solid electrolytes. For example, the use of a polymer blend as an electrolyte will render the device easier to manufacture inasmuch as the polymer blend will not require pressing and, in addition, will maintain its physical integrity due to its durability and elasticity. This is in contradistinction to other types of solid electrolytes which, in the pressed state, are very brittle, thus being readily subject to disintegration, and therefore are hard to work into a display device. Another advantage which is possessed by the polymer blend which comprises the electrolyte of the present device is that the polymer may be fabricated to form an electrolyte which is relatively thin in nature, thus requiring less material with a concurrent reduction in cost, in contrast to a pressed solid electrolyte which is thicker in nature. The electrochromic display device utilizing such a polymer blend as the electrolyte will also require a lower voltage for a successful operation, for example, requiring a voltage of about 0.5 volts as compared to a voltage of about 1 volt for a pressed electrolyte.

It is therefore an object of this invention to provide an electrochromic display device.

A further object of this invention resides in an electrochromic display device which utilizes as a solid electrolyte a polymer blend of the type hereinafter set forth in greater detail.

In one aspect, an embodiment of this invention resides in an electrochromic device comprising in combination an electronic conductor, an electrochromic material in contact with said conductor, a solid electrolyte comprising a blend of an organic polymer and a heteropoly acid or salt thereof disposed on said electrochromic material and a counter-electrode in contact with said solid electrolyte.

A specific embodiment of this invention is found in an electrochromic device comprising in combination an electrically conductive support comprising glass coated with tin oxide, an electrochromic material comprising tungsten trioxide in contact with said support, a solid electrolyte comprising a blend of poly(vinyl alcohol) and dodecamolybdophosphoric acid disposed on said tungsten trioxide, and a counterelectrode comprising platinum, the thickness of said device being in a range of from about 5 to about 100 microns.

Other objects and embodiments will be found in the following further detailed description of the invention.

DETAILED DESCRIPTION OF THE INVENTION

As hereinbefore set forth, the present invention is concerned with an electrochromic device in which the electrolyte which is employed in combination with other components of the device comprises a blend of an organic polymer and a heteropoly acid or salt thereof. The electrochromic display device will comprise a combination of an electronic conductor, an electrochromic material, and electrolyte of the type hereinafter set forth in greater detail, and a counter-electrode. The electronic conductor will comprise an electrically conductive support. This electrically conductive support may be either transparent or reflective in nature, and may be electrically conductive per se or coated with an electronic conductive material. For example, when the support is transparent in nature, it may consist of glass, quartz, transparent polymers, etc. Conversely, when the support is reflective in nature, it may be formed from a metal which is electrically conductive per se such as aluminum, nickel, platinum, palladium, tin, gold, silver, etc. or may be formed of a nonconductive material, non-transparent material such as wood, plastic, rubber, etc. which themselves are coated with an electronic conductive material. It is also contemplated within the scope of this invention that supports which are transparent in nature may also be formed from transparent polymers which possess electrically conductive properties or which may be doped to possess the desired property. When the support comprises glass, quartz, or a nonconductive polymer, the support may be coated with a material which will provide the desired conductivity. For example, glass may be coated with electronically conductive materials such as tin oxide, antimony tin oxide, indium tin oxide, etc. to provide the desired electronic conductor.

The electrochromic material which is in contact with the electronic conductor will comprise those materials which are capable of manifesting a change in color when subjected to the action of protons due to the application of an electrical voltage. The electrochromic materials will comprise, in general, the oxides of metals which possess multiple oxidation states, some representative samples of these metal oxides will include tungsten oxide, molybdenum oxide, chromium oxide, niobium oxide, vanadium oxide, titanium oxide, manganese oxide, iridium oxide, rhodium oxide, ruthenium oxide, nickel oxide, osmium oxide, rhenium oxide, cobalt oxide, etc. In addition, it is also contemplated within the scope of this invention that the electrochromic materials which form one component of the electrochromic device of the present invention may also comprise polymeric redox dyes. Some examples of these dyes which may be employed will include the alkyl or aromatic-substituted viologens, or other ionenes, phenazines, phthalocyanines, metalloporphyrins, etc.

The solid electrolyte, which is used as a protonic conductor to enable the disassociated hydrogen to contact the electrochromic material, comprises a blend of an organic polymer and a heteropoly acid or salt thereof. Examples of organic polymers which may be employed as one component of the blend of the present invention include poly(vinyl alcohol), poly(acrylic acid), polyethylene oxide, polyethyleneimine, polyacrylic acid, polyethylene glycol, cellulose acetate, polyvinylmethylethyl ether, phenol formaldehyde resins, etc.

Examples of heteropoly acids or salts thereof which may be employed as the second component of the organic-inorganic blend which may be used to form a membrane will possess the generic formula:

$$A_m[X_xY_yO_z] \cdot n\ H_2O$$

in which X and Y may be selected from the group consisting of boron, aluminum, gallium, silicon, germanium, tin, phosphorus, arsenic, antimony, bismuth, selenium, tellurium, iodine, and the first, second, third and fourth transitional metal series, said series including scandium, yttrium, lanthanum, actinium, titanium, zirconium, hafnium, vanadium, niobium, tantalum, chromium, molybdenum and tungsten, X and Y being dissimilar in nature, Y being at least one metal selected from the first, second, third or fourth transition metal series above named, A is selected from the group consisting of hydrogen, ammonium, sodium, potassium, lithium, rubidium, cesium, beryllium, magnesium, calcium, strontium and barium, m is an integer of from 1 to 10, y is an integer of from 6 to 12 based on x taken as 1, z is an integer of from 30 to 80 and n is an integer of from 3 to 100.

Specific examples of these compounds will include dodecamolybdophosphoric acid, ammonium molybdophosphate, sodium molybdophosphate, potassium molybdophosphate, lithium molybdophosphate, calcium molybdophosphate, magnesium molybdophosphate, dodecatungstophosphoric acid, ammonium tungstophosphate, sodium tungstophosphate, potassium tungstophosphate, lithium tungstophosphate, calcium tungstophosphate, magnesium tungstophosphate, dodecamolybdosilicic acid, ammonium molybdosilicate, sodium molybdosilicate, potassium molybdosilicate, lithium molybdosilicate, calcium molybdosilicate, magnesium molybdosilicate, dodecamolybdogermanic acid, ammonium molybdogermanate, sodium molybdogermanate, potassium molybdogermanate, lithium molybdogermanate, calcium molybdogermanate, magnesium molybdogermanate, hexamolybdotelluric acid, ammonium molybdotellurate, sodium molybdotellurate, potassium molybdotellurate, lithium molybdotellurate, calcium molybdotellurate, magnesium molybdotellurate, dodecatungstosilicic acid, ammonium tungstosilicate, sodium tungstosilicate, potassium tungstosilicate, lithium tungstosilicate, calcium tungstosilicate, magnesium tungstosilicate, etc. It is also contemplated within the scope of this invention that some uranyl compounds may also be employed as the heteropoly acid or salt thereof. These uranyl compounds will possess the generic formula:

$$A[UO_2]XO_4 \cdot n\ H_2O$$

in which A is selected from the group consisting of hydrogen, lithium, sodium, potassium, ammonium, copper, magnesium, calcium, barium, strontium, lead, iron, cobalt, nickel, manganese and aluminum, X is selected from the group consisting of phosphorus and arsenic and n is an integer of from 1 to 4. Some specific examples of these uranyl compounds will include uranyl orthophosphate, uranyl orthoarsenate, lithium uranylphosphate, lithium uranylarsenate, sodium uranylphosphate, sodium uranylarsenate, potassium uranylphosphate, potassium uranylarsenate, ammonium uranylphosphate, ammonium uranylarsenate, calcium uranylphosphate, calcium uranylarsenate, barium uranylphosphate, barium uranylarsenate, copper uranylphosphate, copper uranylarsenate, iron uranylphosphate, iron uranylarsenate, cobalt uranylphosphate, cobalt uranylarsenate, nickel uranylphosphate, nickel uranylarsenate, etc.

It is to be understood that the aforementioned listing of organic polymeric compounds, heteropoly acids or salts thereof are only representative of the class of compounds which may be employed in formulating the organic-inorganic blends of the present invention, and that this invention is not necessarily limited thereto.

Some representative examples of organic-inorganic polymer blends which may be used to provide the solid electrolyte in the form of a thin film which acts as a proton conductor in the electrochromic device of the present invention will include poly(vinyl alcohol)-dodecamolybdophosphoric acid, cellulose acetate-dodecamolybdophosphoric acid, polyethylene oxide-dodecamolybdophosphoric acid, polyethylene glycol-dodecamolybdophosphoric acid, poly(vinyl alcohol)-dodecatungstophosphoric acid, cellulose acetate-dodecatungstophosphoric acid, polyethylene oxide-dodecatungstophosphoric acid, polyethylene glycol-dodecatungstophosphoric acid, poly(vinyl alcohol)-dodecamolybdosilicic acid, cellulose acetate-dodecamolybdosilicic acid, polyethylene oxide-dodecamolybdosilicic acid, polyethylene glycol-dodecamolybdosilicic acid, poly(vinyl alcohol)-ammonium molybdophosphate, cellulose acetate-ammonium molybdophosphate, polyethylene oxide-ammonium molybdophosphate, polyethylene glycol-ammonium molybdophosphate, poly(vinyl alcohol)-uranyl orthophosphate, poly(acrylic acid)-dodecamolybdophosphoric acid, poly(acrylic acid)-dodecatungstophosphoric acid, poly(acrylic acid)-uranyl orthophosphate, cellulose acetate-uranyl orthophosphate, polyethylene oxide-uranyl orthophosphate, polyethylene glycol-uranyl orthophosphate, etc. It is to be understood that the aforementioned list of polymer blends is only representative of the class of blends which may be employed as solid electrolytes in the electrochromic display device of the present invention and that the type of blend is not necessarily limited thereto.

BRIEF DESCRIPTION OF THE DRAWING

The Figures represent schematic cross-sectional views of electrochromic display devices of the present invention. It is to be noted that variations may be made without departing from the general scope of the invention.

Referring now to the drawing, in FIG. 1 which is one embodiment of the display device of the present invention, the electrochromic display device comprises a support 1 which, as hereinbefore set forth, may be either transparent or reflective in nature such as glass, metal, plastic, etc. The support will be thick enough to provide structural strength and support for the remaining elements or components of the device. In one embodiment the electronic conductor 2 is deposited on the support, said electronic conductor comprising a conductive material such as tin oxide. An electrochromic material 3 is in contact with the conductive material and support in a relatively thin layer, the thickness of which is hereinafter set forth in greater detail. The solid electrolyte 4 is disposed on the electrochromic material in contact therewith, the solid electrolyte comprising a blend of an organic polymer and a heteropoly acid or salt thereof. In contact with the electrolyte is counter-electrode 5, the counter-electrode comprising a conductive metal deposited on the electrolytic membrane. The device is then connected by contacts 6 and 7 to an electric source 8 which may comprise a battery or an electric circuit. While the above description of the drawing shows separate support 1 and electronic conductor 2, it is contemplated within the scope of this invention that the electrically conductive material such as tin oxide may be incorporated into the support such as a transparent polymer so that the support and electronic conductor may comprise only one layer, this variation being within the intention or parameters of the invention.

Figure 1:
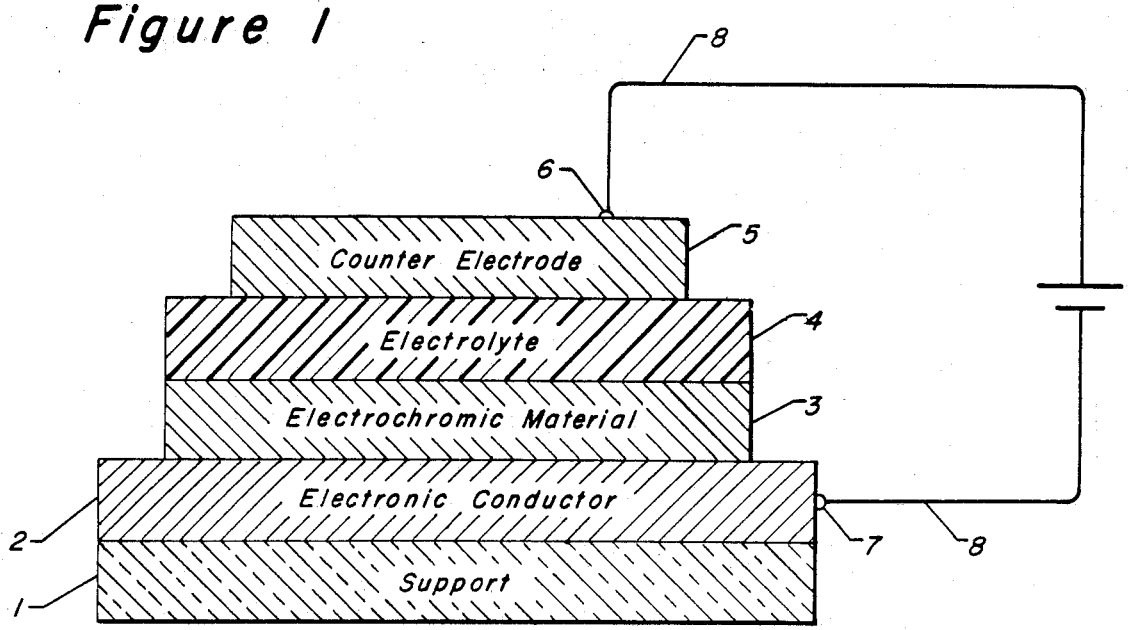

In one embodiment the electrochromic display device may be prepared by depositing the electronically conductive material on the surface of a solid support such as glass in any manner known in the art. For example, a compound such as tin chloride may be deposited on the surface of the support in a vapor state in an oxygen atmosphere at a temperature which may range from about 300° to about 400° C. to provide a layer of tin oxide on the glass. Alternatively, the tin oxide may be sputter deposited on the support, either method of deposition being sufficient to form a film of electrically conductive material on the support having a thickness of from about 100 to about 1000 Angstroms. Following the deposition of the electrically conductive material on the support, the electrochromic material is then applied to the electronic conductor by any manner so selected, the various methods of deposition including sputter deposition, electrodeposition, evaporation, or solution deposition in an amount sufficient to impart a layer of electrochromic material in contact with the electronic conductor which will have a thickness in the range of from about 1,000 to about 10,000 Angstroms. When employing these methods of depositing the electrochromic material on the surface of the electronic conductor, deposition conditions which are employed will include temperatures ranging from about 4° to about 80° C. and atmospheric pressure.

Following the deposition of the electrochromic material on the electronic conductor, the solid electrolyte is then applied to the surface of the electrochromic material. The solid electrolyte which comprises a blend of an organic polymer and a heteropoly acid or salt thereof of the type hereinbefore set forth in greater detail is prepared by admixing the two components of the blend in a mutually miscible solvent under solution conditions for a period of time sufficient to form the desired blend. The mutually miscible solvent which is generally employed to dissolve the components comprises water, although it is also contemplated that other mutually miscible solvents, either inorganic or organic in nature, may also be employed. The solution conditions will usually include a temperature in the range of from about ambient up to the boiling point of the mutually miscible solvent for a period of time necessary to form the blend. This time will vary with the particular components of the blend as well as the solvent and may range for a period of time from about 0.5 up to about 10 hours or more in duration. Upon completion of the solution period, the blend is then cast upon the surface of the electrochromic material in such an amount as to form a relatively thin film of a solid electrolyte layer having a thickness of from about 4 to about 99 microns. After casting the solution upon the surface of the electrochromic material, the solvent is removed by any conventional means including natural evaporation or forced evaporation by the application of elevated temperatures whereby the solvent is evaporated and the desired film of the polymeric blend is formed. The last component of the electrochromic display device is applied to the surface of the electrolyte which is not in contact with the electrochromic material also by any means convenient to employ. For example, in one embodiment of the invention, the counter-electrode comprising a conductive material such as platinum, palladium, etc. may be sputter deposited on the electrolyte in such an amount so as to provide an electrode having a thickness of from about 200 to about 1000 Angstroms. In addition, the surface area of the counter-electrode will vary in size, the size of the electrode being sufficient to provide a good contact with the electrical system.

Figure 2:
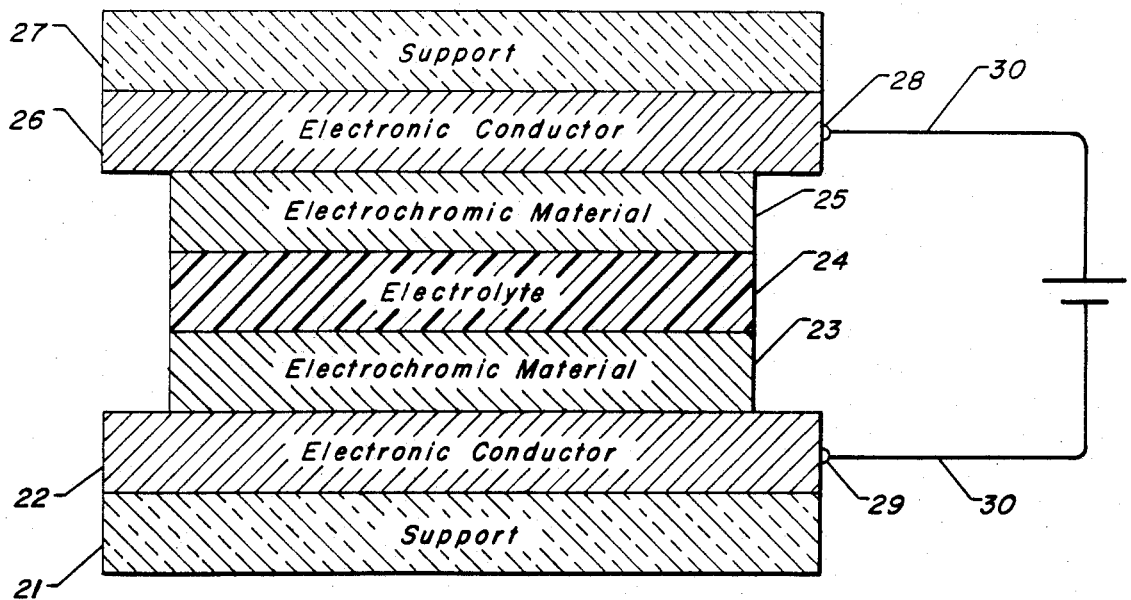
FIG. 2 represents another embodiment of the invention in which support 21, comprising glass or a transparent polymer which is thick enough to provide structural strength and support, has deposited thereon an electronic conductor 22 of the type similar in nature to that hereinbefore set forth in the description of FIG. 1. It is also contemplated that, as in the prior description of FIG. 1, the electronic conductor may be incorporated into the support. An electrochromic material 23 such as tungsten trioxide, molybdenum trioxide, etc. of the type hereinbefore set forth in greater detail is in contact with the electronic conductor 22 in the form of a relatively thin layer. Solid electrolyte 24 is disposed on the electrochromic material and in contact therewith, said solid electrolyte also comprising a blend of an organic polymer and a heteropoly acid or salt thereof. The electrolyte will contain an inert compound which is capable of effecting a diffuse scattering of light, thus rendering the electrolyte nontransparent in nature. The counter-electrode will comprise a combination of electrochromic material 25 similar in nature to electrochromic material 23 in contact with electrolyte 24. Also, in contact with electrochromic material 25 is an electronic conductor 26, said electronic conductor 26 also being similar in nature to electronic conductor 22. Support member 27 will contact the side of electronic conductor 26 which is not in contact with electrochromic material 25. The device, which represents a solid electrolyte 27 sandwiched between the electronic conductor and support will be connected by means of contacts 28 and 29 to an electric source 30 which, as in the case of the other embodiment of the invention, comprises a battery or an electric circuit.

When preparing an electrochromic display device as illustrated by FIG. 2 of the drawing, the electronic conductive material is deposited on the surface of a transparent support such as glass, polymer, etc. in a manner similar to that hereinbefore described. Alternatively, the transparent support may comprise an electrically conductive transparent material such as an electrically conductive polymer in which the presence of the electronic conductor may be omitted. Following the deposition of the electrically conductive material to the support, the electrochromic material is then deposited on the surface of the electronic conductor also in a manner similar to that hereinbefore set forth. The solid electrolyte comprising a blend of an organic polymer and a heteropoly acid or salt thereof may then be cast on the surface of the electronic conductor in the form of a thin film membrane. The counterelectrode, which, in this instance comprises a combination of the support, electronic conductor and electrochromic material in the form of layers is then placed on the upper surface of the electrolyte so that the electrochromic material is in contact with the electrolyte and thereafter pressed to insure a permanent and intimate contact between the counter-electrode and the electrolyte. The solid electrolyte comprising the polymeric blend will also contain an inert compound such as titanium dioxide, zinc oxide, aluminum oxide, etc. which will produce the diffused scattering of light and thus render the electrolyte non-transparent in nature. The electrochromic display device which now comprises a symmetrical device in which the electrolyte is sandwiched between two layers of the electrochromic material which itself is in contact with a transparent electronic conductor, the latter comprising an electrically conductive support, is then fitted with electrical contacts which are, in turn, connected to a source of electricity.

As hereinbefore set forth, the power which is required to operate the electrochromic display will be greater than the power which is required to operate a liquid crystal display but less than that which is required to operate a light-emitting diode display. Generally speaking, the voltage required to operate an electrochromic display device may range from about 0.4 to about 1.5 volts with a change in color being effected for a period which may range from about 25 to about 500 milliseconds. In the range of response time to the electric current, it is to be noted that the response time of the electrochromic display is greater than the response time for a liquid crystal display, but less than that of the light-emitting display. Again, the power may come from any source such as a battery or electric current, either direct current or countercurrent in nature.

The following examples are given to illustrate a process for preparing an electrochromic device of the present invention. However, it is to be understood that these examples are given merely for purposes of illustration and that the present process is not necessarlly limited thereto.

EXAMPLE I

In this example, a conductive glass substrate having a layer of tin oxide deposited thereon was placed in a sputter deposition chamber. The sputter deposition of tungsten trioxide on the tin oxide was effected at a pressure of about 100 torr for a period of 20 minutes using a combination of air and argon as the sputter gas, utilizing a tungsten target.

A solution of a polymeric blend was prepared by admixing poly(vinyl alcohol) and dodecamolybdophosphoric acid in a 50/50% by weight amount with a sufficient amount of water to obtain a 2% solution of the blend. The polymeric blend was then cast on the tin oxide/tungsten trioxide coated glass and allowed to dry at ambient temperature to give a thin membrane film which was approximately 5 microns in thickness.

Thereafter, the device in which the polymeric blend membrane acts as a solid electrolyte, was placed in a sputter deposition chamber and subjected to the sputter deposition of platinum thereon until a thickness of about 200 Angstroms of platinum was deposited on the surface of the membrane. Electrical contacts were then added to the platinum which acted as a counter-electrode and to the glass containing the tin oxide deposited thereon which acted as the electronic conductor. An electric charge of 10 millicoulombs per square cm was charged to the device and the tungsten oxide changed from transparent to blue.

EXAMPLE II

In a manner similar to that set forth in Example I above, an electrochromic display device was prepared by sputter-depositing tungsten trioxide on the surface of a tin oxide glass-coated substrate. The polymeric blend which formed a membrane, the latter acting as a solid electrolyte, was prepared by dissolving equal proportions by weight of poly(vinyl alcohol) and dodecatungstophosphoric acid. The polymer was cast on the surface of the electrochromic material and, after being allowed to dry, had platinum sputter-deposited thereon to form a counterelectrode. The tungsten oxide had a thickness of about 1000 Angstroms, the membrane a thickness of about 5 microns and the platinum a thickness of about 200 Angstroms. When an electric current was charged to the device, the tungsten trioxide changed from transparent to a blue color.

EXAMPLE III

To illustrate an electrochromic display device as shown in FIG. 2 of the drawing, two pieces of conductive glass substrates having a layer of tin oxide deposited thereon were treated in a manner similar to that set forth in Example I above, that is, by being placed in a sputter deposition chamber. The pressure in the cylinder was reduced to approximately 100 torr and tungsten trioxide was sputter-deposited on the tin oxide surface utilizing a combination of air and argon as the sputter gas.

Thereafter, a solution of a polymeric blend was prepared by admixing equal amounts by weight of poly(acrylic acid) and dodecatungstophosphoric acid, plus a sufficient amount of titanium dioxide to impart an opaqueness or milk-like appearance to the polymeric solution, with water to obtain a 2% solution of the blend. The polymeric blend solution was then cast on one of the tungsten trioxide-treated tin oxidecoated glass supports to obtain a thin film. Thereafter, the second tungsten trioxide-treated tin oxide-coated glass support was placed on the surface of the polymer, the tin oxide contacting the polymer. The device was allowed to dry at ambient temperature, electrical contacts were added to the conductive supports and a charge of 10 millicoulombs/square cm was charged to the device.

The tungsten trioxide changed from transparent to a blue color, said blue color remaining after the charge had been discontinued.

We claim as our invention:

1. An electrochromic device comprising in combination an electronic conductor, an electrochromic material in contact with said conductor, a solid electrolyte formed as a solution phase blend in a mutually miscible solvent of an organic polymer and a heteropoly acid or salt thereof disposed on said electrochromic material and a counter-electrode in contact with said solid electrolyte.

2. The electrochromic device as set forth in claim 1 in which said device possesses a thickness in the range of from about 5 to about 100 microns.

3. The electrochromic device as set forth in claim 1 in which said electronic conductor comprises an electrically conductive support.

4. The electrochromic device as set forth in claim 3 in which said electrically conductive support is transparent in nature.

5. The electrochromic device as set forth in claim 3 in which said electrically conductive support is reflective in nature.

6. The electrochromic device as set forth in claim 4 in which said electrically conductive support comprises glass coated with an electrically conductive material.

7. The electrochromic device as set forth in claim 6 in which said electrically conductive material comprises tin oxide.

8. The electrochromic device as set forth in claim 6 in which said electrically conductive material comprises antimony tin oxide.

9. The electrochromic device as set forth in claim 6 in which said electrically conductive material comprises indium tin oxide.

10. The electrochromic device as set forth in claim 4 in which said electrically conductive support comprises an electrically conductive polymer.

11. The electrochromic device as set forth in claim 5 in which said electrically conductive support comprises an electrically conductive metal.

12. The electrochromic device as set forth in claim 1 in which said electrochromic material comprises an oxide of a metal which possesses multiple oxidation states.

13. The electrochromic device as set forth in claim 12 in which said electrochromic material comprises tungsten trioxide.

14. The electrochromic device as set forth in claim 12 in which said electrochromic material comprises molybdenum trioxide.

15. The electrochromic device as set forth in claim 12 in which said electrochromic material comprises vanadium trioxide.

16. The electrochromic device as set forth in claim 12 in which said electrochromic material comprises niobium trioxide.

17. The electrochromic device as set forth in claim 12 in which said electrochromic material comprises titanium trioxide.

18. The electrochromic device as set forth in claim 1 in which said electrochromic material comprises a polymeric redox dye.

19. The electrochromic device as set forth in claim 1 in which said blend of an organic polymer and a heteropoly acid or salt thereof comprises poly(vinyl alcohol)-dodecamolybdophosphoric acid.

20. The electrochromic device as set forth in claim 1 in which said blend of an organic polymer and a heteropoly acid or salt thereof comprises poly(acrylic acid)-dodecatungstophosphoric acid.

21. The electrochromic device as set forth in claim 1 in which said blend of an organic polymer and a heteropoly acid or salt thereof comprises poly(vinyl alcohol)-dodecatungstophosphoric acid.

22. The electrochromic device as set forth in claim 1 in which said blend of an organic polymer and a heteropoly acid or salt thereof comprises poly(vinyl alcohol)-ammonium molybdophosphoric acid.

23. The electrochromic device as set forth in claim 1 in which said blend of an organic polymer and a heteropoly acid or salt thereof comprises poly(acrylic acid)-uranyl orthophosphate.

24. The electrochromic device as set forth in claim 1 in which said counter-electrode comprises palladium.

25. The electrochromic device as set forth in claim 1 in which said counter-electrode comprises platinum.

26. The electrochromic device as set forth in claim 1 in which said counter-electrode comprises nickel.

27. The electrochromic device as set forth in claim 1 in which said counter-electrode comprises an electronic conductor and an electrochromic material in contact with said electrolyte.

28. The electrochromic device as set forth in claim 27 in which said electronic conductor comprises an electrically conductive support.

29. The electrochromic device as set forth in claim 28 in which said electrically conductive support comprises glass coated with an electrically conductive material.

30. The electrochromic device as set forth in claim 29 in which said electrically conductive material comprises tin oxide.

31. The electrochromic device as set forth in claim 29 in which said electrically conductive material comprises antimony tin oxide.

32. The electrochromic device as set forth in claim 29 in which said electrically conductive material comprises indium tin oxide.

33. The electrochromic device as set forth in claim 28 in which said electrochromic support comprises an electrically conductive polymer.

34. The electrochromic device as set forth in claim 27 in which said electrolyte contains an inert compound which will produce diffuse scattering of light.

35. The electrochromic device as set forth in claim 34 in which said inert compound comprises titanium dioxide.

36. The electrochromic device as set forth in claim 35 in which said inert compound comprises zinc oxide.

37. The electrochromic device of claim 1 wherein said solid electrolyte comprises a solution phase blend of (1) a heteropoly acid or salt thereof having the generic formula:

$$A_m[X_xY_yO_z]\cdot nH_2O$$

in which X and Y may be selected from the group consisting of boron, aluminum, gallium, silicon, germanium, tin, phosphorus, arsenic, antimony, bismuth, selenium, tellurium, iodine, and metals of the first, second, third and fourth transitional metal series of the Periodic Table and where Y is dissimilar from X and is selected from at least one metal of the first, second, third and fourth transitional metal series of the Periodic Table, A is selected from the group consisting of hydrogen, ammonium, sodium, potassium, lithium, rubidium, cesium, beryllium, magnesium, calcium, strontium and barium, m is an integer of from about 1 to 10, y is an integer of from 6 to 12 based on x being equal to 1, z is an integer of from 30 to 80 and n is an integer of from 3 to 100 and, (2) a polymer selected from the group consisting of poly(vinyl alcohol), polyethylene oxide, polyethyleneimine, polyacrylic acid, polyethylene glycol, cellulose acetate, polyvinylmethyethyl ether and phenol formaldehyde resins.

* * * * *